Patented Oct. 18, 1938

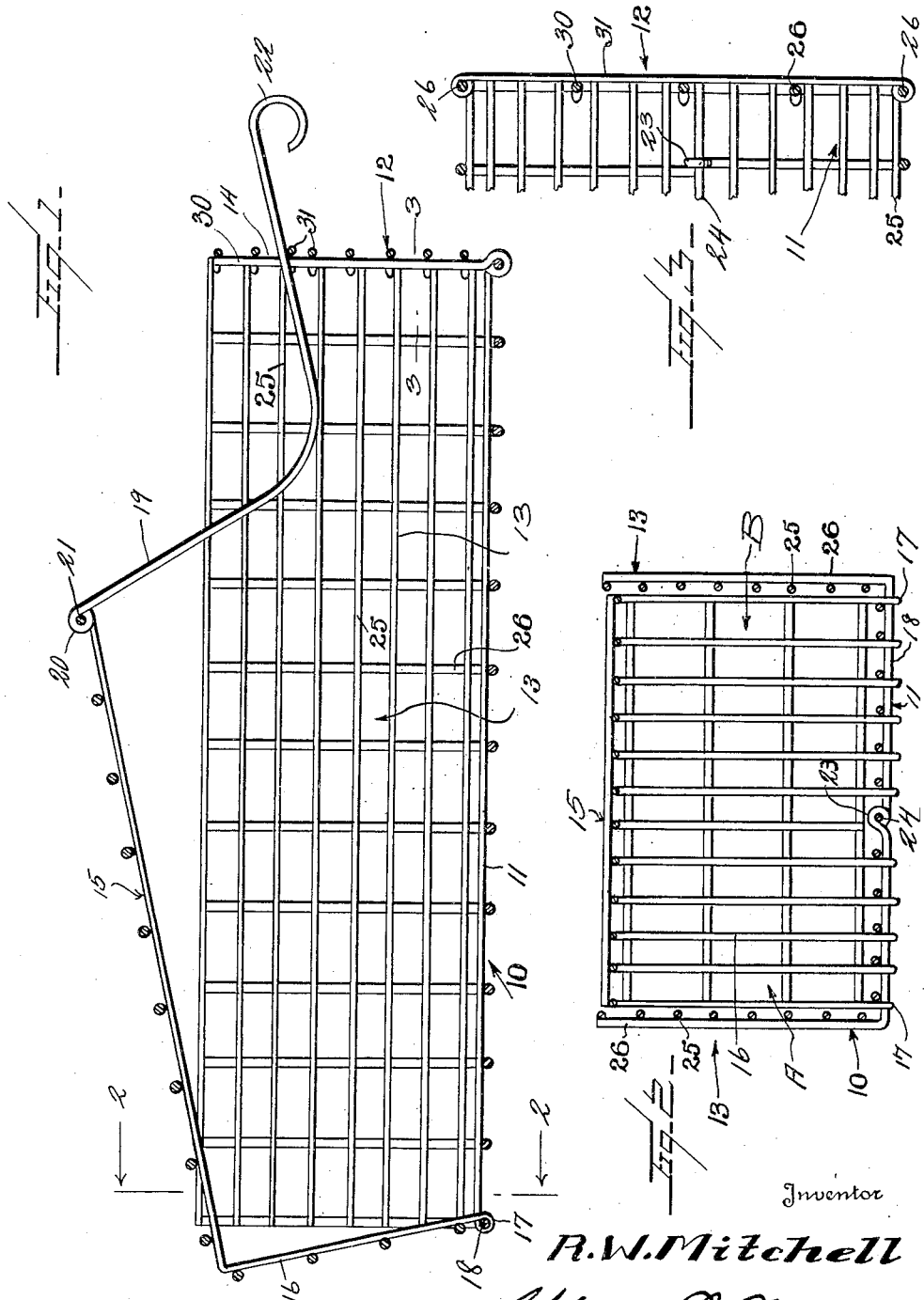

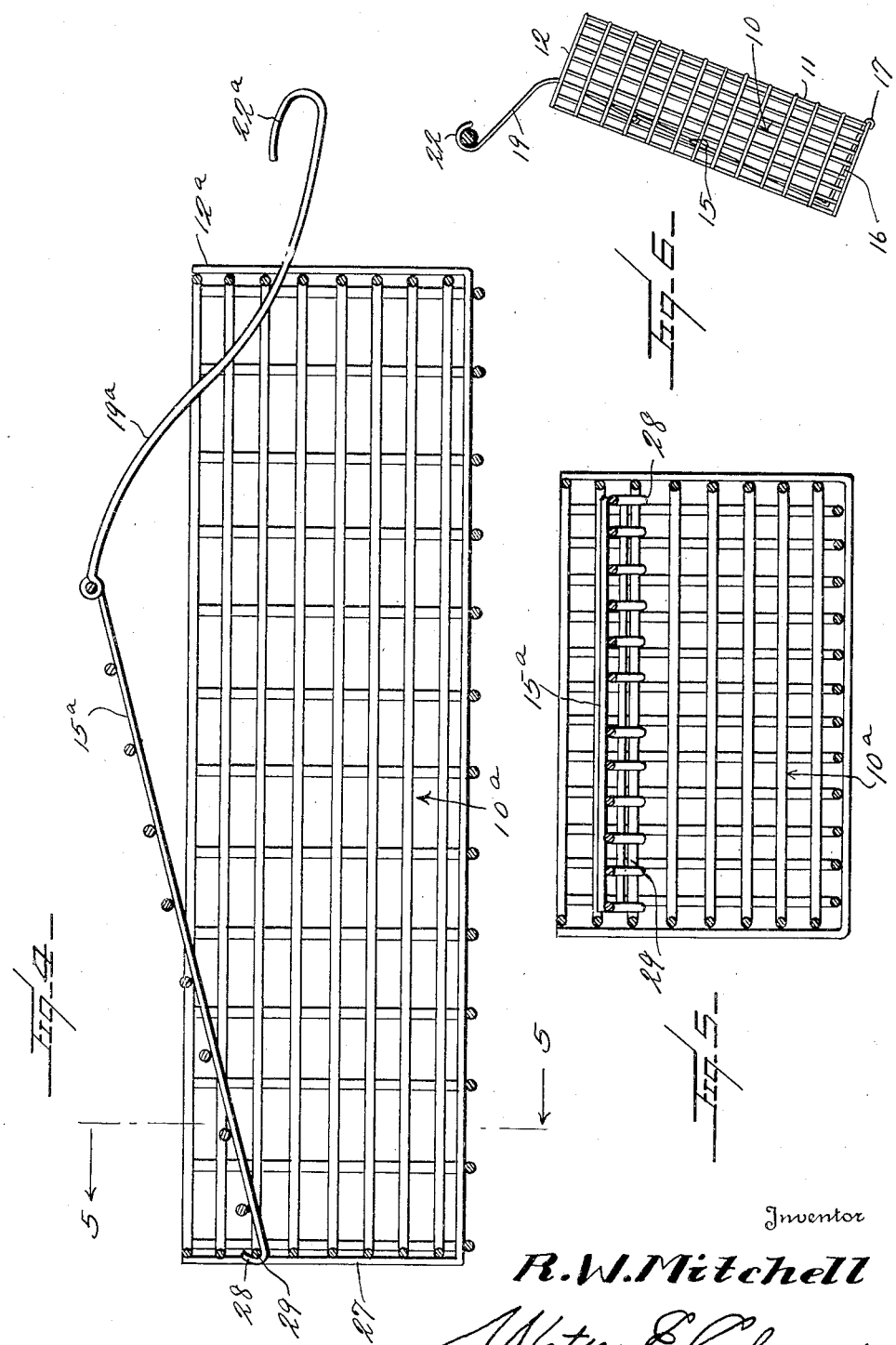

2,133,667

UNITED STATES PATENT OFFICE 2,133,667

MEANS FOR SHAPING AND SMOKING MEATS

Robert W. Mitchell, Allentown, Pa.

Application June 10, 1937, Serial No. 147,543

6 Claims. (Cl. 17—44.2)

In meat packing houses, it is the practice to place meat to be smoked and to be afterwards sold in package form, into a device whereby the meat is pressed into compacted shape and at the same time smoked. The present invention relates to means for performing this function and particularly to an open-work cage or receptacle within which the meat is placed, the cage having means whereby the meat may be pressed and compacted and whereby the cage may be hung up within a smokehouse.

A further object is to provide means of this character in which the cover of the cage, this cover acting to press the meat, is forced inward by a lever which extends out through the cage and which is formed with a hook at one end whereby the cage may be supported within the smokehouse, this lever being so formed that the weight of the meat within the cage causes the movable pressing member of the cage to be forced toward and against the meat to compress it.

A still further object is to provide means whereby a steady and constant pressure may be exerted upon the meat within the cage as the meat shrinks in the course of drying.

Still another object is to provide a device of this character by which the meat can be pressed and smoked at the same time instead of the meat being pressed first, as for instance, for a period of about forty-eight hours before smoking as is the practice today in packing houses.

Other objects will appear in the course of the following description.

My invention is illustrated in the accompanying drawings wherein:—

Fig. 1 is a longitudinal section through one form of my meat shaping and holding structure.

Fig. 2 is a section on the line 2—2 of Fig. 1.

Fig. 3 is a fragmentary section on the line 3—3 of Fig. 1.

Fig. 4 is a longitudinal section through another form of my device.

Fig. 5 is a section on the line 5—5 of Fig. 4.

Fig. 6 is an elevation showing the device suspended.

Referring to Figs. 1 to 3, it will be seen that the cage consists of a rectangular body designated generally 10 having a bottom 11, an end wall 12 and side walls 13. These walls are formed of interwoven relatively heavy wire so that the body, while of open-work construction, is nevertheless relatively rigid. The end wall 12 is formed with a relatively enlarged aperture 14 for a purpose to be later stated. The open side of the body is partially closed by a pressing element 15 also formed of wire, this pressing element having at one end the inwardly extending portion 16 which at its inner end is formed with hooks 17 embracing one of the wires 18 of which the body is formed. The pressing element 15 operates between the walls 13 and terminates short of the wall 12. The pressing element, it will be seen, is hinged at 17—18, as previously stated, so that the pressing element may be forced inward toward the wall 11 or opened out away from this wall. A lever 19 is formed with a hook 20 at one end which embraces one of the transverse wires 21 of this pressing element 15 and the lever passes out through the opening 14 and at its extremity is formed with a hook 22. This lever is curved along its length or bowed in the manner illustrated, and this lever fulcrums against one of the transverse wires defining the opening 14. When meat is placed within the body or cage 10 and the body or cage 10 is suspended by the hooked end 22 of the lever, the weight of the meat will cause the body 10 to swing to the position shown in Fig. 6. This will tend to bring the axes of the pivots 18, 21 and hook 22 into line, as shown in Fig. 6, thus forcing the pressing element 15 in Fig. 1 or 15ª in Fig. 4 inward against the meat and keeping a constant pressure thereon. As this meat shrinks, the pressing element moves further in and, as before stated, exerts a constant pressure on the meat. While I have referred to the portion 11 as the bottom of the cage, it is to be understood that the cage is suspended by the hook 22 in a vertical position, as shown in Fig. 6.

While I do not wish to be limited to any detailed formation of the cage and of the press element, I have illustrated the cage and press element as being formed of longitudinal and transverse wires and I have illustrated the bottom of the cage and the side walls of the cage as formed of horizontal wires 25 and vertical wires 26. At the end 12 of the cage, there are vertical wires 30 crossed by the horizontal wires 31. I have illustrated the bottom of the cage with the side walls as made in two lateral sections A and B, one section having hooks 23 which engage a longitudinal wire 24 on the other section. These two sections are held in rigid engagement with each other by the horizontal wires 31 of the end portion 12 which extend around the vertical wires 26 at the adjacent ends of the side walls. The lever 19 extends through the opening 14 defined by the vertical wires 30 and the horizontal wires 31 forming the end 12 of the cage and is thus prevented from undue lateral shifting movement.

In Figs. 1 to 3, I have illustrated the cage before it is filled with meat and hung up. In Fig. 6, however, the cage is shown as being suspended as it would be when the meat is being smoked.

In Figs. 4 and 5, I have illustrated another form of my invention in which the body 10ª of the cage is formed of wires engaged with each other to form an open-work structure. The body 10ª is provided at one end with the wall 12ª but at the other end is closed by an open-work wall 27 rigid with the lateral walls 13ᵃ of the cage. The pressing element 15ᵃ as illustrated, has a plurality of longitudinally extending wires or rods, these wires at their extremities being formed with hooks 28 which are adapted to engage with any of the transverse wires 29 of the end wall 27. The opposite end of the pressing element 15ᵃ is formed with the curved lever 19ᵃ of the same character as the lever 19 previously described and formed with a hook 22ᵃ at its extremity. The hooks 28 may be engaged with any one of the transverse wires 29 and the lever 19ᵃ may extend through any of the apertures defined by the wires constituting the wall 12ᵃ, though a relatively large special opening, such as the opening 14, may be formed in this end wall through which the lever may pass. Here again, when the cage is hung up by means of the hook 22ᵃ, the weight of the meat in the cage will cause the inward movement of the pressing element 15ᵃ as before described and keep a constant pressure upon the meat. With this construction, the presser may be adjusted to suit different packs of meat.

Prior to being placed in the smokehouse, the meat is soaked in vats. The meat is then placed within the cage or receptacle and the presser closed against it and the lever engaged with the supporting wire. This device will so shape the meat that there will be less waste when the meat is cut for the customer and the uniformity of shape will give it a better appearance. Furthermore, because of the shape, less time will be required to smoke the meat and because of the uniform application of smoke and heat, the flavor of the meat will be better than when smoked in the ordinary way. There is less shrinkage in the meat and the product is much more attractive and commands a higher value in the market. The construction shown in Figs. 4 and 5 has this advantage, that it may be used for different sizes of beef knuckles or other meat products instead of being used for a certain uniform-sized package. The use of this device conserves time because the meat is pressed into shape while it is being smoked.

With the construction shown in Figs. 4 and 5, the adjustment of the pressing member 15ᵃ will depend upon the original size of the chunk of meat. If it is a small slab or chunk of meat, the hooks 29 will be engaged with one of the lower cross-bars at one end of the cage 10ᵃ and the lever 19ᵃ will be placed further down within the body. If it is a large chunk, the presser 15ᵃ and the lever 19ᵃ will be disposed nearer to the opening of the body. Of course, there will be a tendency to have greater pressure at one end of the meat than at the other at the very first, but as the meat shrinks from its being exposed to heat and smoke, the pressure will become uniform and will cause a practically uniform slab of meat to be formed.

What is claimed is:—

1. A device for smoking dried beef, including a body having a bottom, opposed side walls and an end wall all formed of open-work material, and a pressing member having an angular end portion pivotally engaged with one end of the bottom of the body and a lever extending through one end wall of the body and pivotally engaged with the adjacent extremity of the pressing member, the lever having a suspension hook at its outer end, the lever being curved in its length whereby to cause the inward movement of the pressing member under the weight of the material contained within the body when the body is in a suspended position.

2. A cage for smoking dried beef, including a body having an open-work bottom, side and end walls, an open-work pressing member hingedly engaged at one end with a wall of the body and a lever passing through an opposite wall of the body and having a hook at its outer end whereby it may be suspended, the inner end of the lever being hingedly engaged with the pressing member, the lever being curved in its length whereby the weight of the material within the body when the body is suspended by the hook on the lever will act to force the pressing member inward.

3. A means for smoking dried beef, including a body having an open-work bottom, side and end walls, one end wall including transversely extending wires and an open-work pressing member having at one end a plurality of hooks engageable with any one of said wires whereby the pressing member may be adjusted nearer to or further from the bottom of the body, and a lever engaged with the free end of the pressing member and extending out through the adjacent end wall and being formed with a hook at its extremity, the lever being bowed in a direction toward the bottom of the body, whereby when the body is supported by said hook on the lever, the weight of material within the body will act to cause the lever to shift the pressing member inward.

4. Means for smoking dried beef including a body having a bottom, side and end walls formed of longitudinally and transversely extending wires and a pressing member formed of transverse and longitudinally extending wires, the pressing member being hingedly engaged with the body at one end and fitting within the side walls, and a lever hingedly engaged with the free end of the pressing member and extending out through the adjacent end wall and being formed at its extremity with a hook, the lever being bowed in a direction toward the bottom of the body.

5. Means for smoking dried beef, including a body having bottom, side and end walls formed of transversely and longitudinally extending wires and a pressing member of open-work construction having at one end a series of hooks engageable with any one of the transverse wires of one end of the cage, and a lever attached to the free end of said pressing member and extending out through a space defined by the longitudinal and transverse wires of the adjacent wall of the body, the lever being bowed toward the bottom of the body, the outer end of the lever having a hook whereby the device may be suspended.

6. A device for smoking dried beef, including a body having an open-work bottom, side and end walls, an open-work pressing member swingingly engaged at one end with one end of the body, and a lever passing through the opposite end wall of the body swingingly engaging the adjacent end of the pressing member, the lever having means at its outer end whereby it may be suspended.

ROBERT W. MITCHELL.